(12) United States Patent  
Ativanichayaphong et al.

(10) Patent No.: US 7,840,409 B2  
(45) Date of Patent: Nov. 23, 2010

(54) ORDERING RECOGNITION RESULTS PRODUCED BY AN AUTOMATIC SPEECH RECOGNITION ENGINE FOR A MULTIMODAL APPLICATION

(75) Inventors: Soonthorn Ativanichayaphong, Boca Raton, FL (US); Charles W. Cross, Jr., Wellington, FL (US); Igor R. Jablokov, Charlotte, NC (US); Gerald McCobb, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 940 days.

(21) Appl. No.: 11/679,284

(22) Filed: Feb. 27, 2007

(65) Prior Publication Data

US 2008/0208585 A1 Aug. 28, 2008

(51) Int. Cl.  
*G10L 21/06* (2006.01)

(52) U.S. Cl. .................................. 704/270.1
(58) Field of Classification Search ................ 704/270.1  
See application file for complete search history.

(56) References Cited

U.S. PATENT DOCUMENTS

| | | | |
|---|---|---|---|
| 5,577,165 A | 11/1996 | Takebayashi et al. |
| 5,584,052 A | 12/1996 | Gulau et al. |
| 5,969,717 A | 10/1999 | Ikemoto |
| 6,208,972 B1 | 3/2001 | Grant et al. |
| 6,243,375 B1 | 6/2001 | Speicher |
| 6,275,806 B1 | 8/2001 | Pertrushin |
| 6,301,560 B1 | 10/2001 | Masters |
| 6,513,011 B1 | 1/2003 | Uwakubo |
| 6,606,599 B2 | 8/2003 | Grant et al. |

(Continued)

FOREIGN PATENT DOCUMENTS

CN 1385783 12/2002

(Continued)

OTHER PUBLICATIONS

Axelsson, et al.; "XHTML+Voice Profile 1.2" Internet, [Online] Mar. 16, 2004 (2004-03-06), pp. 1-53, XP002484188 Retrieved from the Internet: URL: http://www.voicexml.org/specs/mutlimodal/x+v/12/spec.html [retrieved on Jun. 12, 2008].

(Continued)

*Primary Examiner*—Susan McFadden  
(74) *Attorney, Agent, or Firm*—Wolf, Greenfield & Sacks, P.C.

(57) ABSTRACT

Ordering recognition results produced by an automatic speech recognition ('ASR') engine for a multimodal application implemented with a grammar of the multimodal application in the ASR engine, with the multimodal application operating in a multimodal browser on a multimodal device supporting multiple modes of interaction including a voice mode and one or more non-voice modes, the multimodal application operatively coupled to the ASR engine through a VoiceXML interpreter, includes: receiving, in the VoiceXML interpreter from the multimodal application, a voice utterance; determining, by the VoiceXML interpreter using the ASR engine, a plurality of recognition results in dependence upon the voice utterance and the grammar; determining, by the VoiceXML interpreter according to semantic interpretation scripts of the grammar, a weight for each recognition result; and sorting, by the VoiceXML interpreter, the plurality of recognition results in dependence upon the weight for each recognition result.

18 Claims, 5 Drawing Sheets

U.S. PATENT DOCUMENTS

| | | |
|---|---|---|
| 6,856,960 B1 | 2/2005 | Dragosh et al. |
| 6,920,425 B1 | 7/2005 | Will et al. |
| 6,999,930 B1 | 2/2006 | Roberts et al. |
| 7,032,169 B2 * | 4/2006 | Ativanichayaphong et al. ............ 715/201 |
| 7,035,805 B1 | 4/2006 | Miller |
| 7,171,243 B2 | 1/2007 | Watanabe et al. |
| 7,188,067 B2 | 3/2007 | Grant et al. |
| 7,330,890 B1 | 2/2008 | Partovi et al. |
| 7,376,586 B1 | 5/2008 | Partovi et al. |
| 7,487,085 B2 * | 2/2009 | Ativanichayaphong et al. ............ 704/235 |
| 7,509,659 B2 | 3/2009 | Barrus et al. |
| 2002/0065944 A1 | 5/2002 | Hickey et al. |
| 2002/0092019 A1 | 7/2002 | Marcus |
| 2002/0099553 A1 | 7/2002 | Brittan et al. |
| 2002/0120554 A1 | 8/2002 | Vega |
| 2002/0147593 A1 | 10/2002 | Lewis et al. |
| 2002/0184610 A1 | 12/2002 | Chong et al. |
| 2003/0039341 A1 | 2/2003 | Burg et al. |
| 2003/0046316 A1 | 3/2003 | Gergic et al. |
| 2003/0046346 A1 | 3/2003 | Mumick et al. |
| 2003/0101451 A1 | 5/2003 | Bentolila et al. |
| 2003/0125945 A1 | 7/2003 | Doyle |
| 2003/0179865 A1 | 9/2003 | Stillman et al. |
| 2003/0182622 A1 | 9/2003 | Sibal et al. |
| 2003/0195739 A1 | 10/2003 | Washio |
| 2003/0217161 A1 | 11/2003 | Balasuriya |
| 2003/0229900 A1 | 12/2003 | Reisman |
| 2003/0235282 A1 | 12/2003 | Sichelman et al. |
| 2004/0019487 A1 | 1/2004 | Kleindienst et al. |
| 2004/0025115 A1 | 2/2004 | Sienel et al. |
| 2004/0031058 A1 | 2/2004 | Reisman |
| 2004/0044516 A1 | 3/2004 | Kennewick et al. |
| 2004/0049390 A1 | 3/2004 | Brittan et al. |
| 2004/0059705 A1 | 3/2004 | Wittke et al. |
| 2004/0083109 A1 | 4/2004 | Halonen et al. |
| 2004/0120472 A1 | 6/2004 | Popay et al. |
| 2004/0120476 A1 | 6/2004 | Harrison et al. |
| 2004/0138890 A1 | 7/2004 | Farrans et al. |
| 2004/0153323 A1 | 8/2004 | Charney et al. |
| 2004/0179038 A1 | 9/2004 | Blattner et al. |
| 2004/0216036 A1 | 10/2004 | Chu et al. |
| 2004/0236574 A1 | 11/2004 | Ativanichayaphong |
| 2004/0260562 A1 | 12/2004 | Kijirai |
| 2005/0075884 A1 | 4/2005 | Badt |
| 2005/0091059 A1 | 4/2005 | Lecoeuche |
| 2005/0131701 A1 | 6/2005 | Cross |
| 2005/0138219 A1 | 6/2005 | Boughannam |
| 2005/0138647 A1 | 6/2005 | Boughannam |
| 2005/0154580 A1 | 7/2005 | Horowitz et al. |
| 2005/0160461 A1 | 7/2005 | Baumgartner et al. |
| 2005/0188412 A1 | 8/2005 | Dacosta |
| 2005/0203729 A1 | 9/2005 | Roth et al. |
| 2005/0203747 A1 | 9/2005 | Lecoeuche |
| 2005/0261908 A1 | 11/2005 | Cross |
| 2005/0273769 A1 | 12/2005 | Eichenberger et al. |
| 2005/0283367 A1 | 12/2005 | Cross |
| 2006/0047510 A1 | 3/2006 | Cross |
| 2006/0064302 A1 | 3/2006 | Cross |
| 2006/0069564 A1 | 3/2006 | Allison et al. |
| 2006/0074680 A1 | 4/2006 | Cross |
| 2006/0075120 A1 | 4/2006 | Smit |
| 2006/0111906 A1 | 5/2006 | Cross |
| 2006/0122836 A1 | 6/2006 | Cross |
| 2006/0123358 A1 | 6/2006 | Lee et al. |
| 2006/0136222 A1 | 6/2006 | Cross |
| 2006/0146728 A1 | 7/2006 | Engelsma et al. |
| 2006/0168095 A1 | 7/2006 | Sharma et al. |
| 2006/0168595 A1 | 7/2006 | McArdle |
| 2006/0184626 A1 | 8/2006 | Agapi |
| 2006/0190264 A1 | 8/2006 | Jaramillo |
| 2006/0218039 A1 | 9/2006 | Johnson |
| 2006/0229880 A1 | 10/2006 | White |
| 2006/0235694 A1 | 10/2006 | Cross |
| 2006/0287845 A1 | 12/2006 | Cross et al. |
| 2006/0287865 A1 | 12/2006 | Cross et al. |
| 2006/0287866 A1 | 12/2006 | Cross et al. |
| 2006/0288309 A1 | 12/2006 | Cross et al. |
| 2007/0265851 A1 | 11/2007 | Cross et al. |
| 2007/0274296 A1 | 11/2007 | Cross et al. |
| 2007/0274297 A1 | 11/2007 | Cross et al. |
| 2007/0288241 A1 | 12/2007 | Cross et al. |
| 2007/0294084 A1 | 12/2007 | Cross et al. |
| 2008/0065386 A1 | 3/2008 | Cross et al. |
| 2008/0065387 A1 | 3/2008 | Cross et al. |
| 2008/0065388 A1 | 3/2008 | Cross et al. |
| 2008/0065389 A1 | 3/2008 | Cross et al. |
| 2008/0065390 A1 | 3/2008 | Ativanichayaphong et al. |
| 2008/0086564 A1 | 4/2008 | Putman et al. |
| 2008/0140410 A1 | 6/2008 | Cross et al. |
| 2008/0162136 A1 | 7/2008 | Ativanichayaphong et al. |
| 2008/0177530 A1 | 7/2008 | Cross et al. |
| 2008/0195393 A1 | 8/2008 | Cross et al. |
| 2008/0208584 A1 | 8/2008 | Cross et al. |
| 2008/0208585 A1 | 8/2008 | Ativanichayaphong et al. |
| 2008/0208586 A1 | 8/2008 | Ativanichayaphong et al. |
| 2008/0208587 A1 | 8/2008 | Cross et al. |
| 2008/0208588 A1 | 8/2008 | Cross et al. |
| 2008/0208589 A1 | 8/2008 | Cross et al. |
| 2008/0208590 A1 | 8/2008 | Cross et al. |
| 2008/0208591 A1 | 8/2008 | Ativanichayaphong et al. |
| 2008/0208592 A1 | 8/2008 | Cross et al. |
| 2008/0208593 A1 | 8/2008 | Ativanichayaphong et al. |
| 2008/0208594 A1 | 8/2008 | Cross et al. |
| 2008/0228494 A1 | 9/2008 | Cross et al. |
| 2008/0228495 A1 | 9/2008 | Cross, Jr. et al. |
| 2008/0235021 A1 | 9/2008 | Cross et al. |
| 2008/0235022 A1 | 9/2008 | Cross et al. |
| 2008/0235027 A1 | 9/2008 | Cross |
| 2008/0235029 A1 | 9/2008 | Cross et al. |
| 2008/0249782 A1 | 10/2008 | Ativanichayaphong et al. |
| 2008/0255850 A1 | 10/2008 | Cross et al. |
| 2008/0255851 A1 | 10/2008 | Cross et al. |

FOREIGN PATENT DOCUMENTS

| | | |
|---|---|---|
| CN | 1385783 A | 12/2002 |
| CN | 1564123 A | 1/2005 |
| EP | 0794670 A | 9/1997 |
| EP | 1450350 | 8/2004 |
| EP | 1450350 A | 8/2004 |
| GB | 0507148.5 | 4/2005 |
| JP | 2000155529 A | 6/2000 |
| JP | 02003140672 A | 5/2003 |
| WO | WO 99/48088 | 9/1999 |
| WO | WO 00/51106 A | 8/2000 |
| WO | WO 02/32140 A | 4/2002 |
| WO | WO 2004/062945 A | 7/2004 |
| WO | WO2006108795 | 10/2006 |

OTHER PUBLICATIONS

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] Jun. 13, 2005 (2005-16-13), pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. PCT/EP2008/051358.

PCT Search Report, Jun. 18, 2008; PCT Application No. PCT/EP2008/051363.

Didier Guillevic, et al.,Robust Semantic Confidence Scoring ICSLP 2002: 7$^{th}$ International Conference On Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

U.S. Appl. No. 10/924,520, filed Aug. 24, 2004, Charles W. Cross, Jr.
U.S. Appl. No. 10/945,112, filed Sep. 20, 2004, Charles W. Cross, Jr.
U.S. Appl. No. 10/870,517, filed Jun. 17, 2004, Charles W. Cross, Jr.
U.S. Appl. No. 10/441,839, filed May 20, 2003, S. Ativanichayaphong.
U.S. Appl. No. 11/062,731, filed Feb. 22, 2005, David Jaramillo.
U.S. Appl. No. 11/007,830, filed Dec. 8, 2004, Charles W. Cross, Jr.
U.S. Appl. No. 10/945,119, filed Sep. 20, 2004, Charles W. Cross, Jr.
U.S. Appl. No. 11/022,464, filed Dec. 22, 2004, Charles W. Cross, Jr.
U.S. Appl. No. 10/741,997, filed Dec. 19, 2003, Akram Boughannam.
U.S. Appl. No. 10/741,499, filed Dec. 19, 2003, Akram Boughannam.
U.S. Appl. No. 11/056,493, filed Feb. 11, 2005, Ciprian Agapi.
U.S. Appl. No. 11/093,545, filed Mar. 30, 2005, Marc White.
U.S. Appl. No. 11/105,865, filed Apr. 14, 2005, Charles W. Cross, Jr.
U.S. Appl. No. 10/849,642, May 19, 2004, Charles W. Cross, Jr.
U.S. Appl. No. 10/992,979, filed Nov. 19, 2004, Charles W. Cross, Jr.
U.S. Appl. No. 10/733,610, filed Dec. 11, 2003, Charles W. Cross, Jr.
U.S. Appl. No. 10/919,005, filed Dec. 2005, Eichenberger, et al.
U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.
International Preliminary Report on Patentability and Written Opinion from PCT application PCT/EP2008/051363 dated Sep. 1, 2009.
PCT Search Report, Jun. 18, 2008; PCT Application No.; PCT/EP2008/051363.
Didier Guillevic, et al,; Robust Semantic Confidence Scoring ICSLP 2002: 7$^{th}$ International Conference on Spoken Language Processing. Denver, Colorado, Sep. 16-20, 2002; [International Conference on Spoken Language Processing. (ICSLP)], Adelaide: Causal Productions, AU, Sep. 16, 2002, p. 853, XP007011561 ISBN: 978-1-876346-40-9.

* cited by examiner

ORDERING RECOGNITION RESULTS PRODUCED BY AN AUTOMATIC SPEECH RECOGNITION ENGINE FOR A MULTIMODAL APPLICATION

BACKGROUND OF THE INVENTION

1. Field of the Invention

The field of the invention is data processing, or, more specifically, methods, apparatus, and products for ordering recognition results produced by an automatic speech recognition ('ASR') engine for a multimodal application.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications are often formed by sets of markup documents served up by web servers for display on multimodal browsers. A 'multimodal browser,' as the term is used in this specification, generally means a web browser capable of receiving multimodal input and interacting with users with multimodal output, where modes of the multimodal input and output include at least a speech mode. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

Currently, a multimodal application performs speech recognition by submitting digitized speech to an automatic speech recognition ('ASR') engine. The ASR engine receives digitized speech from the multimodal application and matches the digitized speech with a set of recognized words or phrases. The matched set of word or phrases are then returned to the multimodal application. Often the ASR engine returns more than one word or phrase for each clip of digital speech submitted by the multimodal application for recognition because the audible characteristics of the results are similar. Consider, for example, that a multimodal application provided an ASR engine with digitized speech for the song title "That Girl." The ASR engine may return the following matched phrases:

Bad Girl
Dad's Girl
That Girl
Third World

The order in which the ASR engine returns each of the matched results is typically based on the confidence level that the ASR engine calculates for each result, which specifies how confident the ASR engine is that each result matches the digitized speech. The result with the highest confidence level is first in order, the result with the second highest confidence level is second in order, the result with the third highest confidence level is third in order, and so on. The drawback to this current method of ordering recognition results is that the current method does not take into account other available information that might be used to order the recognition results in a manner that more accurately reflects the probability that each recognition result matches the digitized speech. As such, readers will appreciate that room for improvement exists in ordering recognition results produced by an ASR engine for a multimodal application.

SUMMARY OF THE INVENTION

Ordering recognition results produced by an automatic speech recognition ('ASR') engine for a multimodal application implemented with a grammar of the multimodal application in the ASR engine, with the multimodal application operating in a multimodal browser on a multimodal device supporting multiple modes of interaction including a voice mode and one or more non-voice modes, the multimodal application operatively coupled to the ASR engine through a VoiceXML interpreter, includes: receiving, in the VoiceXML interpreter from the multimodal application, a voice utterance; determining, by the VoiceXML interpreter using the ASR engine, a plurality of recognition results in dependence upon the voice utterance and the grammar; determining, by the VoiceXML interpreter according to semantic interpretation scripts of the grammar, a weight for each recognition result; and sorting, by the VoiceXML interpreter, the plurality of recognition results in dependence upon the weight for each recognition result.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
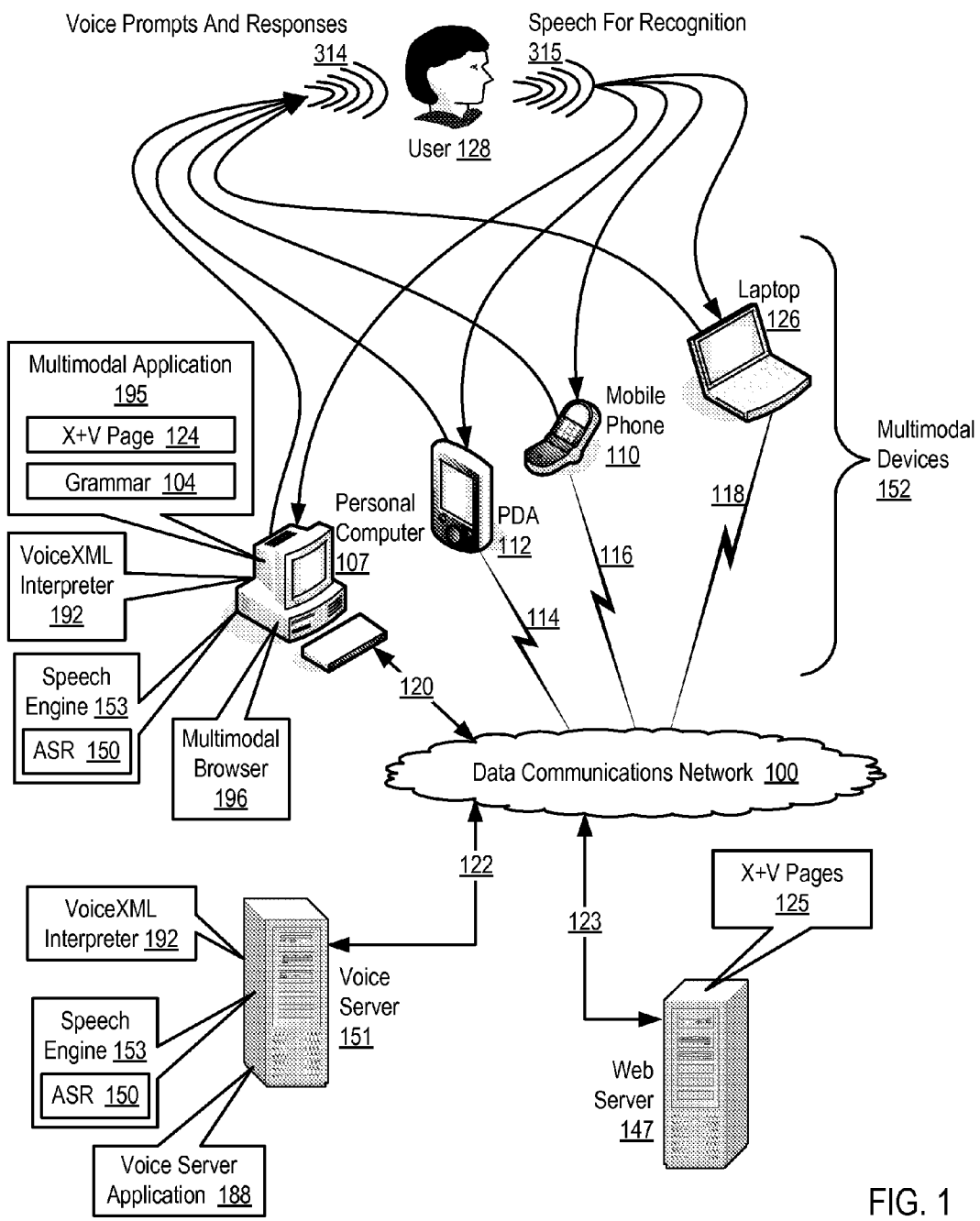
FIG. 1 sets forth a network diagram illustrating an exemplary system for ordering recognition results produced by an automatic speech recognition engine for a multimodal application according to embodiments of the present invention.

Exemplary methods, apparatus, and products for ordering recognition results produced by an automatic speech recognition ('ASR') engine for a multimodal application according to embodiments of the present invention are described with reference to the accompanying drawings, beginning with FIG. 1. FIG. 1 sets forth a network diagram illustrating an exemplary system for ordering recognition results produced by an ASR engine for a multimodal application according to embodiments of the present invention. Ordering recognition results produced by an ASR engine for a multimodal application in this example is implemented with a multimodal application (195) operating in a multimodal browser (196) on a multimodal device (152). The multimodal application (195) is composed of one or more X+V pages (124). The multimodal device (152) supports multiple modes of interaction including a voice mode and one or more non-voice modes of user interaction with the multimodal application (195). The voice mode is represented here with audio output of voice prompts and responses (177) from the multimodal devices and audio input of speech for recognition (315) from a user (128). Non-voice modes are represented by input/output devices such as keyboards and display screens on the multimodal devices (152). The multimodal application is operatively coupled (195) to an automatic speed recognition ('ASR') engine (150) through a VoiceXML interpreter (192). The operative coupling may be implemented with an application programming interface ('API'), a voice service module, or a VOIP connection as explained more detail below.

Ordering recognition results produced by an ASR engine for a multimodal application (195) is implemented with a grammar (104) of the multimodal application (195) in the ASR engine (150). The grammar (104) of FIG. 1 communicates to the ASR engine (150) the words and sequences of words that currently may be recognized. In the example of FIG. 1, the grammar (104) includes grammar rules that advise an ASR engine or a voice interpreter which words and word sequences presently can be recognized. Grammars for use according to embodiments of the present invention may be expressed in any format supported by an ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog"><![CDATA[
  #JSGF V1.0;
  grammar command;
  <command> = [remind me to] call | phone | telephone <name> <when>;
  <name> = bob | martha | joe | pete | chris | john | artoush | tom;
  <when> = today | this afternoon | tomorrow | next week;
  ]]>
</grammar>
```

In this example, the elements named <command>, <name>, and <when> are rules of the grammar. Rules are a combination of a rulename and an expansion of a rule that advises an ASR engine or a VoiceXML interpreter which words presently can be recognized. In the example above, rule expansions includes conjunction and disjunction, and the vertical bars '|' mean 'or.' An ASR engine or a VoiceXML interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush' or 'tom,' and the <when> rule accepts 'today' or 'this afternoon' or 'tomorrow' or 'next week.' The command grammar as a whole matches utterances like these, for example:

"phone bob next week,"

"telephone martha this afternoon,"

"remind me to call chris tomorrow," and

"remind me to phone pete today."

As mentioned above, the multimodal application (196) operates in the multimodal browser (196), which provides an execution environment for the multimodal application (195). To support the multimodal browser (196) in processing the multimodal application (195), the system of FIG. 1 includes a VoiceXML interpreter (192). The VoiceXML interpreter (192) is a software module of computer program instructions that accepts voice dialog instructions from a multimodal application, typically in the form of a VoiceXML <form> element. The voice dialog instructions include one or more grammars, data input elements, event handlers, and so on, that advise the VoiceXML interpreter (192) how to administer voice input from a user and voice prompts and responses to be presented to a user. The VoiceXML interpreter (192) administers such dialogs by processing the dialog instructions sequentially in accordance with a VoiceXML Form Interpretation Algorithm ('FIA').

The VoiceXML interpreter (192) of FIG. 1 is improved for ordering recognition results produced by the ASR engine (150) for the multimodal application (195) according to embodiments of the present invention. The VoiceXML interpreter (192) may operate generally for ordering recognition results produced by the ASR engine (150) for the multimodal application (195) according to embodiments of the present invention by: receiving, in the VoiceXML interpreter (192) from the multimodal application (195), a voice utterance; determining, by the VoiceXML interpreter (192) using the ASR engine, a plurality of recognition results in dependence upon the voice utterance and the grammar (104); determining, by the VoiceXML interpreter (192) according to semantic interpretation scripts of the grammar (104), a weight for each recognition result; and sorting, by the VoiceXML interpreter (192), the plurality of recognition results in dependence upon the weight for each recognition result.

A multimodal device on which a multimodal application operates is an automated device, that is, automated computing machinery or a computer program running on an automated device, that is capable of accepting from users more than one mode of input, keyboard, mouse, stylus, and so on, including speech input—and also providing more than one mode of output such as, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, a multimodal application may refer to any software application, server-oriented or client-oriented, thin client or thick client, that administers more than one mode of input and more than one mode of output, typically including visual and speech modes.

The system of FIG. 1 includes several example multimodal devices:
- personal computer (107) which is coupled for data communications to data communications network (100) through wireline connection (120),
- personal digital assistant ('PDA') (112) which is coupled for data communications to data communications network (100) through wireless connection (114),
- mobile telephone (110) which is coupled for data communications to data communications network (100) through wireless connection (116), and
- laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled > RTP Payload Format for European Telecommunications Standards Institute (ETSI) European Standard ES 201 108 Distributed Speech Recognition Encoding and the Internet Draft entitled > RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Speech for ordering recognition results produced by an ASR engine for a multimodal application according to embodiments of the present invention may be encoded with any codec, including, for example:
- AMR (Adaptive Multi-Rate Speech coder)
- ARDOR (Adaptive Rate-Distortion Optimized sound codeR),
- Dolby Digital (A/52, AC3),
- DTS (DTS Coherent Acoustics),
- MP1 (MPEG audio layer-1),
- MP2 (MPEG audio layer-2) Layer 2 audio codec (MPEG-1, MPEG-2 and non-ISO MPEG-2.5),
- MP3 (MPEG audio layer-3) Layer 3 audio codec (MPEG-1, MPEG-2 and non-ISO MPEG-2.5),
- Perceptual Audio Coding,
- FS-1015 (LPC-10),
- FS-1016 (CELP),
- G.726 (ADPCM),
- G.728 (LD-CELP),
- G.729 (CS-ACELP),
- GSM,
- HILN (MPEG-4 Parametric audio coding), and
- others as may occur to those of skill in the art.

As mentioned, a multimodal device according to embodiments of the present invention is capable of providing speech to a speech engine for recognition. The speech engine (153) of FIG. 1 is a functional module, typically a software module, although it may include specialized hardware also, that does the work of recognizing and generating or 'synthesizing' human speech. The speech engine (153) implements speech recognition by use of a further module referred to in this specification as a ASR engine (150), and the speech engine carries out speech synthesis by use of a further module referred to in this specification as a text-to-speech ('TTS') engine (not shown). As shown in FIG. 1, a speech engine (153) may be installed locally in the multimodal device (107) itself, or a speech engine (153) may be installed remotely with respect to the multimodal device, across a data communications network (100) in a voice server (151). A multimodal device that itself contains its own speech engine is said to implement a 'thick multimodal client' or 'thick client,' because the thick multimodal client device itself contains all the functionality needed to carry out speech recognition and speech synthesis—through API calls to speech recognition and speech synthesis modules in the multimodal device itself with no need to send requests for speech recognition across a network and no need to receive synthesized speech across a network from a remote voice server. A multimodal device that does not contain its own speech engine is said to implement a 'thin multimodal client' or simply a 'thin client,' because the thin multimodal client itself contains only a relatively thin layer of multimodal application software that obtains speech recognition and speech synthesis services from a voice server located remotely across a network from the thin client. For ease of explanation, only one (107) of the multimodal devices (152) in the system of FIG. 1 is shown with a speech engine (153), but readers will recognize that any multimodal device may have a speech engine according to embodiments of the present invention.

A multimodal application (195) in this example provides speech for recognition and text for speech synthesis to a speech engine through the VoiceXML interpreter (192). As shown in FIG. 1, the VoiceXML interpreter (192) may be installed locally in the multimodal device (107) itself, or the VoiceXML interpreter (192) may be installed remotely with respect to the multimodal device, across a data communications network (100) in a voice server (151). In a thick client architecture, a multimodal device (152) includes both its own speech engine (153) and its own VoiceXML interpreter (192). The VoiceXML interpreter (192) exposes an API to the multimodal application (195) for use in providing speech recognition and speech synthesis for the multimodal application. The multimodal application (195) provides dialog instructions, VoiceXML <form> elements, grammars, input elements, event handlers, and so on, through the API to the VoiceXML interpreter, and the VoiceXML interpreter administers the speech engine on behalf of the multimodal application. In the thick client architecture, VoiceXML dialogs are interpreted by a VoiceXML interpreter on the multimodal device. In the thin client architecture, VoiceXML dialogs are interpreted by a VoiceXML interpreter on a voice server (151) located remotely across a data communications network (100) from the multimodal device running the multimodal application (195).

The VoiceXML interpreter (192) provides grammars, speech for recognition, and text prompts for speech synthesis to the speech engine (153), and the VoiceXML interpreter (192) returns to the multimodal application speech engine (153) output in the form of recognized speech, semantic interpretation results, and digitized speech for voice prompts. In a thin client architecture, the VoiceXML interpreter (192) is located remotely from the multimodal client device in a voice server (151), the API for the VoiceXML interpreter is still implemented in the multimodal device (152), with the API modified to communicate voice dialog instructions, speech for recognition, and text and voice prompts to and from the VoiceXML interpreter on the voice server (151). For ease of explanation, only one (107) of the multimodal devices (152) in the system of FIG. 1 is shown with a VoiceXML interpreter (192), but readers will recognize that any multimodal device may have a VoiceXML interpreter according to embodiments of the present invention. Each of the example multimodal devices (152) in the system of FIG. 1 may be configured to order recognition results produced by an automatic speech recognition ('ASR') engine for a multimodal application by installing and running on the multimodal device a VoiceXML interpreter that orders recognition results produced by an automatic speech recognition ('ASR') engine according to embodiments of the present invention.

The use of these four example multimodal devices (152) is for explanation only, not for limitation of the invention. Any automated computing machinery capable of accepting speech from a user, providing the speech digitized to an ASR engine through a VoiceXML interpreter, and receiving and playing speech prompts and responses from the VoiceXML interpreter may be improved to function as a multimodal device according to embodiments of the present invention.

The system of FIG. 1 also includes a voice server (151), which is connected to data communications network (100) through wireline connection (122). The voice server (151) is a computer that runs a speech engine (153) that provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal applications such as, for example, X+V applications, SALT applications, or Java voice applications.

The system of FIG. 1 includes a data communications network (100) that connects the multimodal devices (152) and the voice server (151) for data communications. A data communications network for ordering recognition results produced by an ASR engine for a multimodal application according to embodiments of the present invention is a data communications data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

a link layer with the Ethernet™ Protocol or the Wireless Ethernet™ Protocol, a data communications network layer with the Internet Protocol ('IP'), a transport layer with the Transmission Control Protocol ('TCP') or the User Datagram Protocol ('UDP'), an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and other protocols as will occur to those of skill in the art.

The system of FIG. 1 also includes a web server (147) connected for data communications through wireline connection (123) to network (100) and therefore to the multimodal devices (152). The web server (147) may be any server that provides to client devices X+V markup documents (125) that compose multimodal applications. The web server (147) typically provides such markup documents via a data communications protocol, HTTP, HDTP, WAP, or the like. That is, although the term 'web' is used to described the web server generally in this specification, there is no limitation of data communications between multimodal devices and the web server to HTTP alone. A multimodal application in a multimodal device then, upon receiving from the web sever (147) an X+V markup document as part of a multimodal application, may execute speech elements by use of a VoiceXML interpreter (192) and speech engine (153) in the multimodal device itself or by use of a VoiceXML interpreter (192) and speech engine (153) located remotely from the multimodal device in a voice server (151).

The arrangement of the multimodal devices (152), the web server (147), the voice server (151), and the data communications network (100) making up the exemplary system illustrated in FIG. 1 are for explanation, not for limitation. Data processing systems useful for ordering recognition results produced by an ASR engine for a multimodal application according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Ordering recognition results produced by an ASR engine for a multimodal application according to embodiments of the present invention in a thin client architecture may be implemented with one or more voice servers, computers, that is, automated computing machinery, that provide speech recognition and speech synthesis. For further explanation, therefore, FIG. 2 sets forth a block diagram of automated computing machinery comprising an example of a computer useful as a voice server (151) in ordering recognition results produced by an ASR engine for a multimodal application according to embodiments of the present invention. The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server (151).

Stored in RAM (168) is a voice server application (188), a module of computer program instructions capable of operating a voice server in a system that is configured to order recognition results produced by an ASR engine for a multimodal application according to embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in multimodal applications such as, for example, X+V applications, SALT applications, or Java Speech applications. Voice server application (188) may be implemented as a web server, implemented in Java, C++, or another language, that supports ordering recognition results produced by an ASR engine for a multimodal application according embodiments of the present invention.

The voice server (151) in this example includes a speech engine (153). The speech engine is a functional module, typically a software module, although it may include specialized hardware also, that does the work of recognizing and synthesizing human speech. The speech engine (153) includes an automated speech recognition ('ASR') engine (150) for speech recognition and a text-to-speech ('TTS') engine (194) for generating speech. The speech engine (153) also includes a grammar (104), a lexicon (106), and a language-specific acoustic model (108). The language-specific acoustic model (108) is a data structure, a table or database, for example, that associates Speech Feature Vectors with phonemes representing, to the extent that it is practically feasible to do so, all pronunciations of all the words in a human language. The lexicon (106) is an association of words in text form with phonemes representing pronunciations of each word; the lexicon effectively identifies words that are capable of recognition by an ASR engine. Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

The voice server application (188) in this example is configured to receive, from a multimodal client located remotely across a network from the voice server, digitized speech for recognition from a user and pass the speech along to the ASR engine (150) for recognition. ASR engine (150) is a module of computer program instructions, also stored in RAM in this example. In carrying out ordering recognition results produced by an ASR engine for a multimodal application, the ASR engine (150) receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Figure 2:
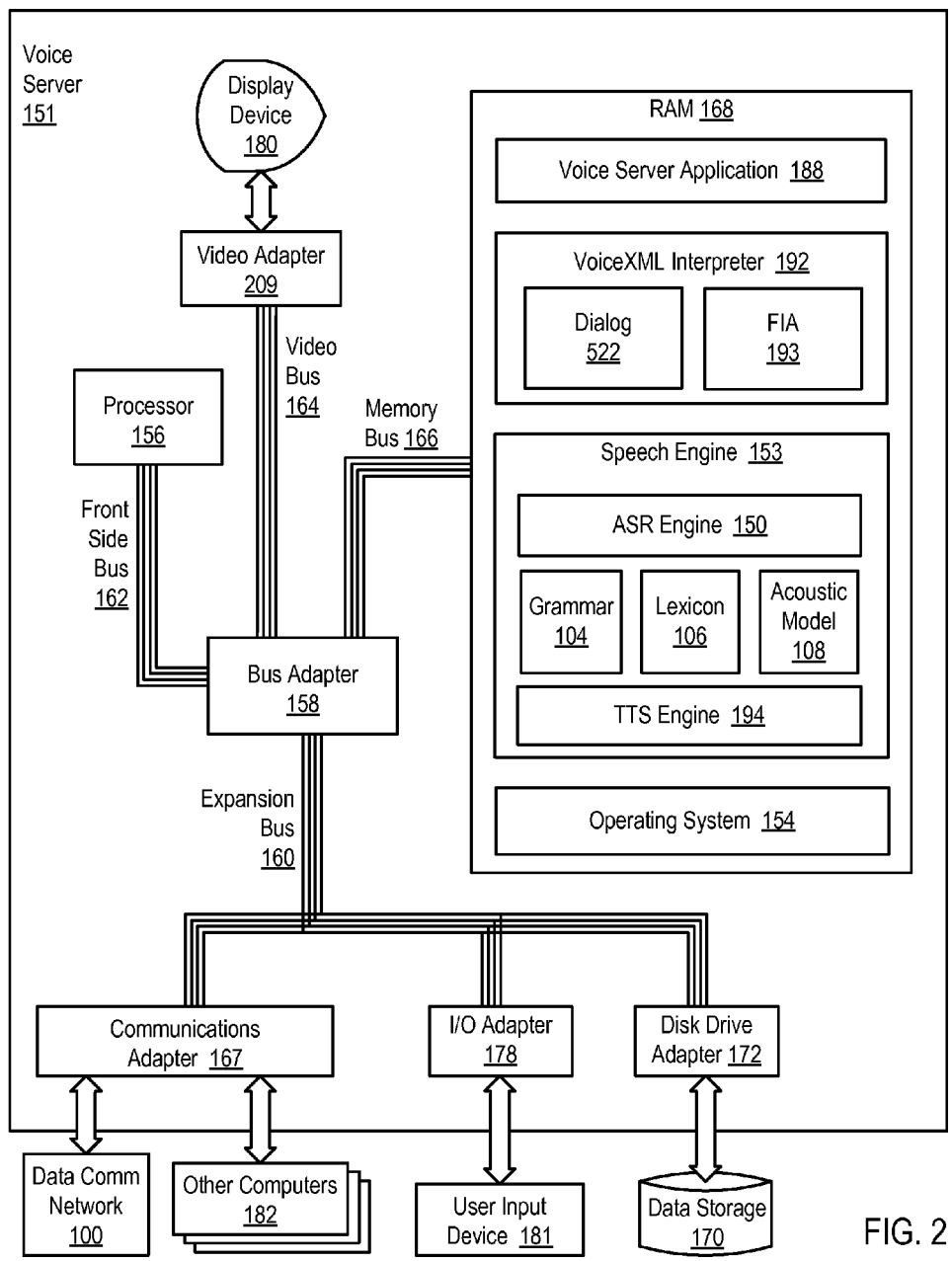
FIG. 2 sets forth a block diagram of automated computing machinery comprising an example of a computer useful as a voice server in ordering recognition results produced by an automatic speech recognition engine for a multimodal application according to embodiments of the present invention.

In the example of FIG. 2, the voice server application (188) passes the speech along to the ASR engine (150) for recognition through a VoiceXML interpreter (192). The VoiceXML interpreter (192) is a software module of computer program instructions that accepts voice dialogs (522) from a multimodal application running remotely on a multimodal device. The dialogs (522) include dialog instructions, typically implemented in the form of a VoiceXML <form> element. The voice dialog instructions include one or more grammars, data input elements, event handlers, and so on, that advise the VoiceXML interpreter (192) how to administer voice input from a user and voice prompts and responses to be presented to a user. The VoiceXML interpreter (192) administers such dialogs by processing the dialog instructions sequentially in accordance with a VoiceXML Form Interpretation Algorithm ('FIA') (193).

The VoiceXML interpreter (192) of FIG. 2 is improved for ordering recognition results produced by the ASR engine (150) for the multimodal application (195) according to embodiments of the present invention. The VoiceXML interpreter (192) may operate generally for ordering recognition results produced by the ASR engine (150) for the multimodal application (195) according to embodiments of the present invention by: receiving, in the VoiceXML interpreter (192) from the multimodal application (195), a voice utterance; determining, by the VoiceXML interpreter (192) using the ASR engine (150), a plurality of recognition results in dependence upon the voice utterance and the grammar (104); determining, by the VoiceXML interpreter (192) according to semantic interpretation scripts of the grammar (104), a weight for each recognition result; and sorting, by the VoiceXML interpreter (192), the plurality of recognition results in dependence upon the weight for each recognition result.

Also stored in RAM (168) is an operating system (154). Operating systems useful in voice servers according to embodiments of the present invention include UNIX™, Linux™, Microsoft NT™, IBM's AIX™, IBM's i5/OS™, and others as will occur to those of skill in the art. Operating system (154), voice server application (188), VoiceXML interpreter (192), speech engine (153), including ASR engine (150), and TTS Engine (194) in the example of FIG. 2 are shown in RAM (168), but many components of such software typically are stored in non-volatile memory also, for example, on a disk drive (170).

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for ordering recognition results produced by an ASR engine for a multimodal application according to embodiments of the present invention include modems for wired dial-up communications, Ethernet (IEEE 802.3) adapters for wired data communications network communications, and 802.11 adapters for wireless data communications network communications.

Figure 3:
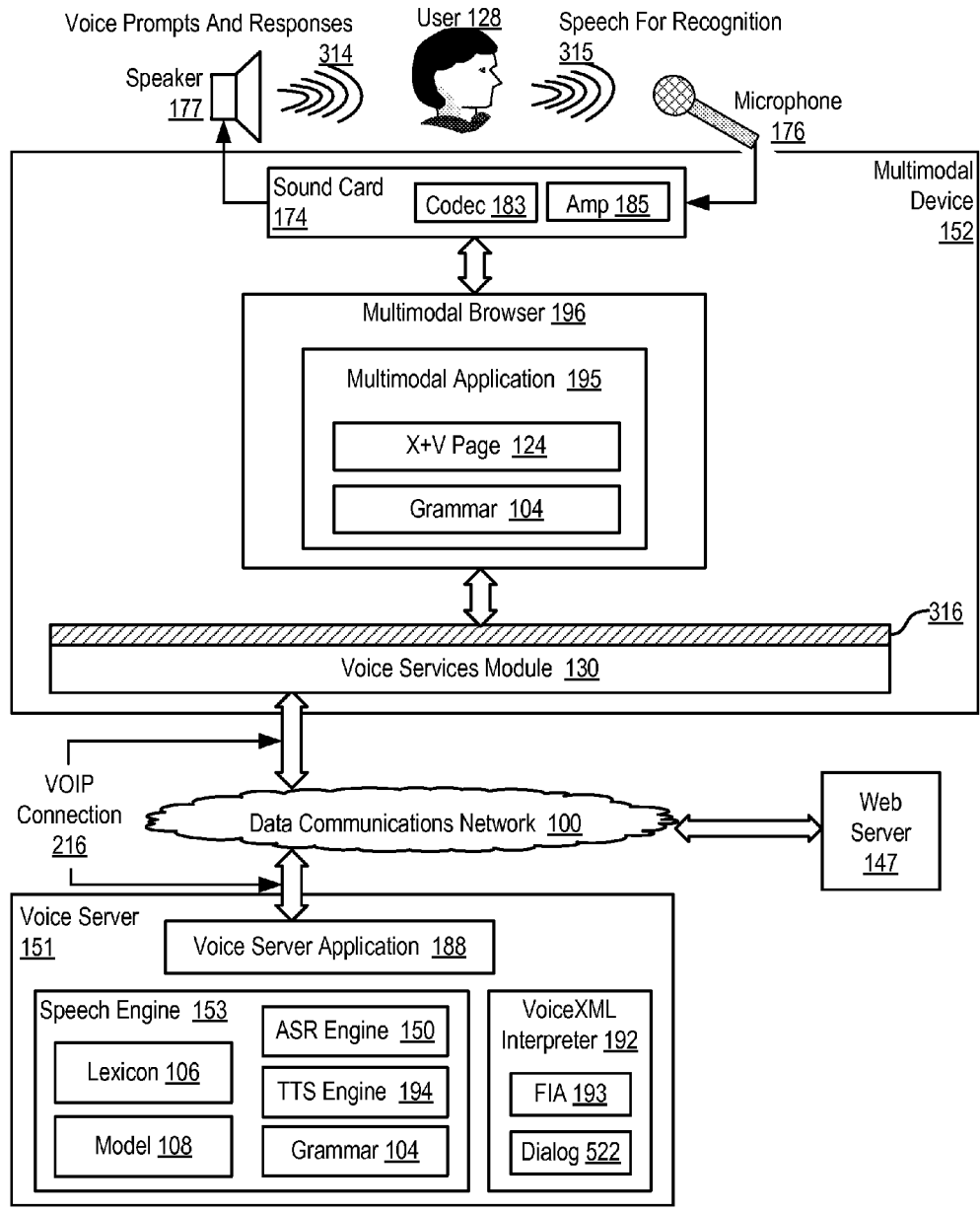
FIG. 3 sets forth a functional block diagram of exemplary apparatus for ordering recognition results produced by an automatic speech recognition engine for a multimodal application according to embodiments of the present invention.

For further explanation, FIG. 3 sets forth a functional block diagram of exemplary apparatus for ordering recognition results produced by an ASR engine for a multimodal application of a multimodal application in a thin client architecture according to embodiments of the present invention. The example of FIG. 3 includes a multimodal device (152) and a voice server (151) connected for data communication by a VOIP connection (216) through a data communications network (100). A multimodal application (195) operates in a multimodal browser (196) on the multimodal device (152), and a voice server application (188) operates on the voice server (151). The multimodal application (195) may be a set or sequence of one or more X+V pages (124) that execute in the multimodal browser (196).

The multimodal device (152) supports multiple modes of interaction including a voice mode and one or more non-voice modes. The example multimodal device (152) of FIG. 3 also supports voice with a sound card (174), which is an example of an I/O adapter specially designed for accepting analog audio signals from a microphone (176) and converting the audio analog signals to digital form for further processing by a codec (183). The example multimodal device (152) of FIG. 3 may support non-voice modes of user interaction with keyboard input, mouseclicks, a graphical user interface ('GUI'), and so on, as will occur to those of skill in the art.

In addition to the multimodal sever application (188), the voice server (151) also has installed upon it a speech engine (153) with an ASR engine (150), a grammar (104), a lexicon (106), a language-specific acoustic model (108), and a TTS engine (194), as well as a Voice XML interpreter (192) that includes a form interpretation algorithm (193). VoiceXML interpreter (192) interprets and executes VoiceXML dialog (522) received from the multimodal application and provided to VoiceXML interpreter (192) through voice server application (188). VoiceXML input to VoiceXML interpreter (192) may originate from the multimodal application (195) implemented as an X+V client running remotely in a multimodal browser (196) on the multimodal device (152). The VoiceXML interpreter (192) administers such dialogs by processing the dialog instructions sequentially in accordance with a VoiceXML Form Interpretation Algorithm ('FIA') (193).

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 3 operates in a manner that is similar to the operation of the system of FIG. 2 described above. Multimodal application (195) is a user-level, multimodal, client-side computer program that presents a voice interface to user (128), provides audio prompts and responses (314) and accepts input speech for recognition (315). Multimodal application (195) provides a speech interface through which a user may provide oral speech for recognition through microphone (176) and have the speech digitized through an audio amplifier (185) and a coder/decoder ('codec') (183) of a sound card (174) and provide the digitized speech for recognition to ASR engine (150). Multimodal application (195), through the multimodal browser (196), an API (316), and a voice services module (130), then packages the digitized speech in a recognition request message according to a VOIP protocol, and transmits the speech to voice server (151) through the VOIP connection (216) on the network (100).

Voice server application (188) provides voice recognition services for multimodal devices by accepting dialog instructions, VoiceXML segments, and returning speech recognition results, including text representing recognized speech, text for use as variable values in dialogs, and output from execution of semantic interpretation scripts—as well as voice prompts. Voice server application (188) includes computer program instructions that provide text-to-speech ('TTS') conversion for voice prompts and voice responses to user input in multimodal applications providing responses to HTTP requests from multimodal browsers running on multimodal devices.

The voice server application (188) receives speech for recognition from a user and passes the speech through API calls to VoiceXML interpreter (192) which in turn uses an ASR engine (150) for speech recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106). The ASR engine then compares speech found as words in the lexicon to words in a grammar (104) to determine whether words or phrases in speech are recognized by the ASR engine.

The multimodal application (195) is operatively coupled to the ASR engine (150) through the VoiceXML interpreter (192). In this example, the operative coupling to the ASR engine (150) through a VoiceXML interpreter (192) is implemented with a VOIP connection (216) through a voice services module (130). The voice services module is a thin layer of functionality, a module of computer program instructions, that presents an API (316) for use by an application level program in providing dialogs (522) and speech for recognition to a VoiceXML interpreter and receiving in response voice prompts and other responses, including action identifiers according to embodiments of the present invention. The VoiceXML interpreter (192), in turn, utilizes the speech engine (153) for speech recognition and generation services.

The VoiceXML interpreter (192) of FIG. 3 is improved for ordering recognition results produced by the ASR engine (150) for the multimodal application (195) according to embodiments of the present invention. The VoiceXML interpreter (192) may operate generally for ordering recognition results produced by the ASR engine (150) for the multimodal application (195) according to embodiments of the present invention by: receiving, in the VoiceXML interpreter (192) from the multimodal application (195), a voice utterance; determining, by the VoiceXML interpreter (192) using the ASR engine (150), a plurality of recognition results in dependence upon the voice utterance and the grammar (104); determining, by the VoiceXML interpreter (192) according to semantic interpretation scripts of the grammar (104), a weight for each recognition result; and sorting, by the VoiceXML interpreter (192), the plurality of recognition results in dependence upon the weight for each recognition result.

In the example of FIG. 3, the voice services module (130) provides data communications services through the VOIP connection and the voice server application (188) between the multimodal device (152) and the VoiceXML interpreter (192). The API (316) is the same API presented to applications by a VoiceXML interpreter when the VoiceXML interpreter is installed on the multimodal device in a thick client architecture. So from the point of view of an application calling the API (316), the application is calling the VoiceXML interpreter directly. The data communications functions of the voice services module (130) are transparent to applications that call the API (316). At the application level, calls to the API (316) may be issued from the multimodal browser (196), which provides an execution environment for the multimodal application (195).

Figure 4:
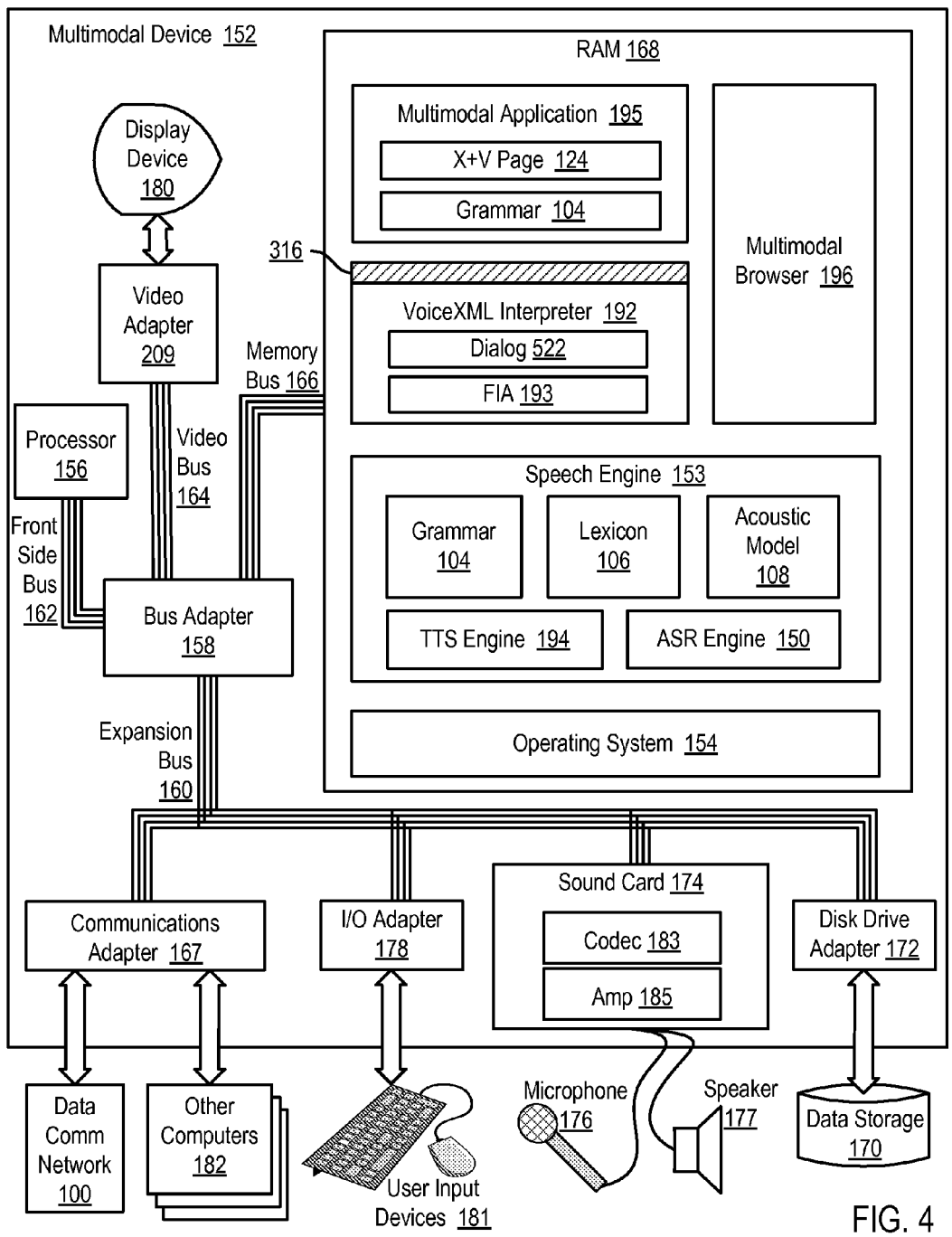
FIG. 4 sets forth a block diagram of automated computing machinery comprising an example of a computer useful as a multimodal device in ordering recognition results produced by an automatic speech recognition engine for a multimodal application according to embodiments of the present invention.

Ordering recognition results produced by an ASR engine for a multimodal application of a multimodal application according to embodiments of the present invention in thick client architectures is generally implemented with multimodal devices, that is, automated computing machinery or computers. In the system of FIG. 1, for example, all the multimodal devices (152) are implemented to some extent at least as computers. For further explanation, therefore, FIG. 4 sets forth a block diagram of automated computing machinery comprising an example of a computer useful as a multimodal device (152) in ordering recognition results produced by an ASR engine for a multimodal application of a multimodal application according to embodiments of the present invention. In a multimodal device implementing a thick client architecture as illustrated in FIG. 4, the multimodal device (152) has no connection to a remote voice server containing a VoiceXML interpreter and a speech engine. Rather, all the components needed for speech synthesis and voice recognition in ordering recognition results produced by an ASR engine for a multimodal application according to embodiments of the present invention are installed or embedded in the multimodal device itself.

The example multimodal device (152) of FIG. 4 includes several components that are structured and operate similarly as do parallel components of the voice server, having the same drawing reference numbers, as described above with reference to FIG. 2: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), a VoiceXML Interpreter (192), a speech engine (153), and so on. As in the system of FIG. 2, the speech engine in the multimodal device of FIG. 4 includes an ASR engine (150), a grammar (104), a lexicon (106), a language-dependent acoustic model (108), and a TTS engine (194). The VoiceXML interpreter (192) administers dialogs (522) by processing the dialog instructions sequentially in accordance with a VoiceXML Form Interpretation Algorithm ('FIA') (193).

The speech engine (153) in this kind of embodiment, a thick client architecture, often is implemented as an embedded module in a small form factor device such as a handheld device, a mobile phone, PDA, and the like. An example of an embedded speech engine useful for ordering recognition results produced by an ASR engine for a multimodal application according to embodiments of the present invention is IBM's Embedded ViaVoice Enterprise. The example multimodal device of FIG. 4 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Also stored in RAM (168) in this example is a multimodal application (195), a module of computer program instructions capable of operating a multimodal device as an apparatus that supports ordering recognition results produced by an ASR engine for a multimodal application according to embodiments of the present invention. The multimodal application (195) implements speech recognition by accepting speech utterances for recognition from a user and sending the utterance for recognition through VoiceXML interpreter API calls to the ASR engine (150). The multimodal application (195) implements speech synthesis generally by sending words to be used as prompts for a user to the TTS engine (194). As an example of thick client architecture, the multimodal application (195) in this example does not send speech for recognition across a network to a voice server for recognition, and the multimodal application (195) in this example does not receive synthesized speech, TTS prompts and responses, across a network from a voice server. All grammar processing, voice recognition, and text to speech conversion in this example is performed in an embedded fashion in the multimodal device (152) itself.

More particularly, multimodal application (195) in this example is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal application (195) may be implemented as a set or sequence of X+V pages (124) executing in a multimodal browser (196) or microbrowser that passes VoiceXML grammars and digitized speech by calls through a VoiceXML interpreter API directly to an embedded VoiceXML interpreter (192) for processing. The embedded VoiceXML interpreter (192) may in turn issue requests for speech recognition through API calls directly to the embedded ASR engine (150). The embedded VoiceXML interpreter (192) may then issue requests to the action classifier (132) to determine an action identifier in dependence upon the recognized result provided by the ASR engine (150). Multimodal application (195) also can provide speech synthesis, TTS conversion, by API calls to the embedded TTS engine (194) for voice prompts and voice responses to user input.

The multimodal application (195) is operatively coupled to the ASR engine (150) through a VoiceXML interpreter (192). In this example, the operative coupling through the VoiceXML interpreter is implemented using a VoiceXML interpreter API (316). The VoiceXML interpreter API (316) is a module of computer program instructions for use by an application level program in providing dialog instructions, speech for recognition, and other input to a VoiceXML interpreter and receiving in response voice prompts and other responses. The VoiceXML interpreter API presents the same application interface as is presented by the API of the voice service module (130 on FIG. 3) in a thin client architecture. At the application level, calls to the VoiceXML interpreter API may be issued from the multimodal browser (196), which provides an execution environment for the multimodal application (195) when the multimodal application is implemented with X+V. The VoiceXML interpreter (192), in turn, utilizes the speech engine (153) for speech recognition and generation services.

The VoiceXML interpreter (192) of FIG. 4 is improved for ordering recognition results produced by the ASR engine (150) for the multimodal application (195) according to embodiments of the present invention. The VoiceXML interpreter (192) may operate generally for ordering recognition results produced by the ASR engine (150) for the multimodal application (195) according to embodiments of the present invention by: receiving, in the VoiceXML interpreter (192) from the multimodal application (195), a voice utterance; determining, by the VoiceXML interpreter (192) using the ASR engine (150), a plurality of recognition results in dependence upon the voice utterance and the grammar (104); determining, by the VoiceXML interpreter (192) according to semantic interpretation scripts of the grammar (104), a weight for each recognition result; and sorting, by the VoiceXML interpreter (192), the plurality of recognition results in dependence upon the weight for each recognition result.

The multimodal application (195) in this example, running in a multimodal browser (196) on a multimodal device (152) that contains its own VoiceXML interpreter (192) and its own speech engine (153) with no network or VOIP connection to a remote voice server containing a remote VoiceXML interpreter or a remote speech engine, is an example of a so-called 'thick client architecture,' so-called because all of the functionality for processing voice mode interactions between a user and the multimodal application—as well as all or most of the functionality for ordering recognition results produced by an ASR engine for a multimodal application of a multimodal application according to embodiments of the present invention—is implemented on the multimodal device itself.

Figure 5:
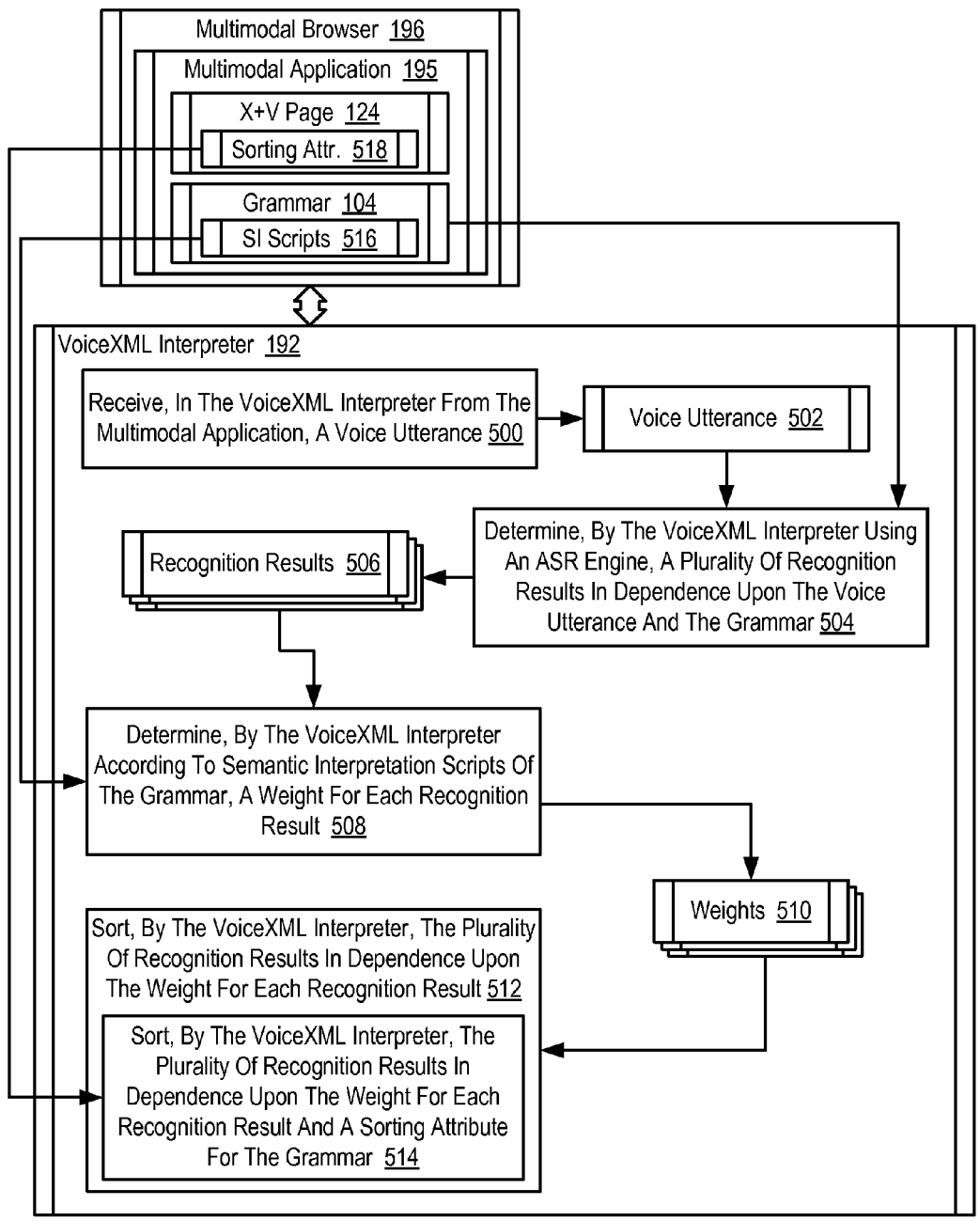
FIG. 5 sets forth a flow chart illustrating an exemplary method of ordering recognition results produced by an automatic speech recognition engine for a multimodal application according to embodiments of the present invention.

For further explanation, FIG. 5 sets forth a flow chart illustrating an exemplary method of ordering recognition results produced by an ASR engine for a multimodal application of a multimodal application according to embodiments of the present invention. Ordering recognition results produced by an ASR engine for a multimodal application in this example is implemented with a multimodal application (195), composed of at least one X+V page (124). The multimodal application (195) operates in a multimodal browser (196) on a multimodal device supporting multiple modes of interaction including a voice mode and one or more non-voice modes of user interaction with the multimodal application. The voice mode may be implemented in this example with audio output through a speaker and audio input through a microphone. Non-voice modes may be implemented by user input devices such as, for example, a keyboard and a mouse.

The multimodal application is operatively coupled to the ASR engine (150) through a VoiceXML interpreter (192). The operative coupling provides a data communications path from the multimodal application (195) to the ASR engine (150) for grammars, speech for recognition, and other input. The operative coupling also provides a data communications path from the ASR engine (150) to the multimodal application (195) for recognized speech, semantic interpretation results, and other results. The operative coupling may be effected with a VoiceXML interpreter (192 on FIG. 4) when the multimodal application is implemented in a thick client architecture. When the multimodal application is implemented in a thin client architecture, the operative coupling may include a voice services module (130 on FIG. 3), a VOIP connection (216 on FIG. 3), and a VoiceXML interpreter (192 on FIG. 3).

The method of FIG. 5 includes receiving (500), in the VoiceXML interpreter (192) from the multimodal application (195), a voice utterance (502). The voice utterance (502) of FIG. 5 represents digitized human speech provided to the multimodal application (195) by a user of a multimodal device. As mentioned above, the multimodal application (195) may acquire the voice utterance (502) from a user through a microphone and encode the voice utterance in a suitable format for storage and transmission using any CODEC as will occur to those of skill in the art. In a thin client architecture, the VoiceXML interpreter (192) may receive (500) the voice utterance (502) from the multimodal application (195) according to the method of FIG. 5 as part of a call by the multimodal application (195) to a voice services module (130 on FIG. 3) to provide voice recognition services. The voice services module, then in turn, passes the voice utterance (502) to the VoiceXML interpreter (192) through a VOIP connection (216 on FIG. 3) and a voice server application (188 on FIG. 3). In a thick client architecture, the VoiceXML interpreter (192) may receive (500) the voice utterance (502) from the multimodal application (195) according to the method of FIG. 5 as part of a call directly to an embedded VoiceXML interpreter (192) by the multimodal application (195) through an API exposed by the VoiceXML interpreter (192).

Ordering recognition results produced by an ASR engine for a multimodal application (124) according to the method of FIG. 5 is implemented with the grammar (104) of the multimodal application (195) in an ASR engine (150). Through the operative coupling between the multimodal application (195) and the ASR engine (150), the multimodal application (195) may provide the grammar (104) to the ASR engine (150). The X+V page (124) of the multimodal application (195) may specify the grammar (104) using the VoiceXML <grammar> element as follows:
    <grammar src="grammar.le"/>

The source attribute 'src' specifies the URI of the definition of the exemplary grammar. Although the above example illustrates how a grammar may be referenced externally, a grammar's definition may also be expressed in-line in an X+V page.

The method of FIG. 5 also includes determining (508), by the VoiceXML interpreter (192) using an ASR engine, a plurality of recognition results (506) in dependence upon the voice utterance (502) and the grammar (104). The VoiceXML interpreter (192) may determine (508) a plurality of recognition results (506) using an ASR engine according to the method of FIG. 5 by passing the voice utterance (502) and the grammar (104) received from the multimodal application (195) to an ASR engine for speech recognition, receiving a plurality of recognition results (506) from the ASR engine, and storing the recognition results (506) in an ECMAScript data structure such as, for example, the application variable array 'application.lastresult$' some other field variable array for a field specified by the X+V page (124).

As mentioned above, the ASR engine often returns more than one recognition result (506) for each voice utterance (502) submitted by the multimodal application (195) for recognition because the audible characteristics of each result (506) is similar. Consider, for example, that a multimodal application operates to play a song when a user speaks the song's title. In such an example, the VoiceXML interpreter (192) received a voice utterance comprising the song title "That Girl." The VoiceXML interpreter (192) may receive the following recognition results from an ASR engine:
    Bad Girl
    Dad's Girl
    That Girl
    Third World
because the audible characteristic of each result are similar. That is in this example, all the results sound similar. The order in which the ASR engine returns each of the matched results to the VoiceXML interpreter is typically based on the confidence level that the ASR engine calculates for each result, which specifies how confident the ASR engine is that each result matches the voice utterance. The result with the highest confidence level is first in order, the result with the second highest confidence level is second in order, the result with the third highest confidence level is third in order, and so on.

As mentioned above, the VoiceXML interpreter (192) of FIG. 5 may store the recognition results (506) in an ECMAScript data structure such as, for example, the 'application.lastresult$' array. ECMAScript data structures represent objects in the Document Object Model ('DOM') at the scripting level in an X+V page. The DOM is created by a multimodal browser when the X+V page of the multimodal application is loaded. The 'application.lastresult$' array holds information about the last recognition generated by an ASR engine for the multimodal application (195). The 'application.lastresult$' is an array of elements where each element, application.lastresult$[i], represents a possible result through the following shadow variables:

application.lastresult$[i].confidence, which specifies the confidence level for this recognition result. A value of 0.0 indicates minimum confidence, and a value of 1.0 indicates maximum confidence.

application.lastresult$[i].utterance, which is the raw string of words that compose this recognition result. The exact tokenization and spelling is platform-specific (e.g. "five hundred thirty" or "5 hundred 30" or even "530").

application.lastresult$[i].inputmode, which specifies the mode in which the user provided the voice utterance. Typically, the value is voice for a voice utterance.

application.lastresult$[i].interpretation, which is an ECMAScript variable containing output from ECMAScript post-processing script typically used to reformat the value contained in the 'utterance' shadow variable.

When the VoiceXML interpreter (192) stores the recognition results in an ECMAScript field variable array for a field specified in the multimodal application (195), the recognition results (506) may be stored in field variable array using shadow variables similar to the application variable 'application.lastresult$.' For example, a field variable array may represent a possible recognition result through the following shadow variables:
    name$[i].confidence,
    name$[i].utterance,
    name$[i].inputmode, and
    name$[i].interpretation,
where 'name$' is a placeholder for the field identifier for a field in the multimodal application (195) specified to store the results of the recognition results (506).

Because the VoiceXML interpreter (192) typically receives the recognition results (506) from an ASR engine in the order of each result's confidence level, the VoiceXML interpreter (192) stores the plurality of recognition results (506) in the 'application.lastresult$' array such that the result with the highest confidence level is ordered first in the 'application.lastresult$' array, the result with the second highest confidence level is ordered second in the 'application.lastresult$' array, the result with the third highest confidence level is ordered third in the 'application.lastresult$' array, and so on. For further explanation, consider that the VoiceXML interpreter (192) receives the following recognition results from an ASR engine in the following order according to each result's confidence level:

| RECOGNITION RESULTS | CONFIDENCE LEVEL |
|---|---|
| Bad Girl | 0.70 |
| Dad's Girl | 0.40 |
| That Girl | 0.35 |
| Third World | 0.20 |

The VoiceXML interpreter (192) may store the exemplary recognition results above in the 'application.lastresult$' array as illustrated below in the following table:

| VALUE | 'APPLICATION.LASTRESULT$' ARRAY |
|---|---|
| Bad Girl | → application.lastresult$[0].utterance |
| 0.70 | → application.lastresult$[0].confidence |
| Dad's Girl | → application.lastresult$[1].utterance |
| 0.40 | → application.lastresult$[1].confidence |
| That Girl | → application.lastresult$[2].utterance |
| 0.35 | → application.lastresult$[2].confidence |
| Third World | → application.lastresult$[3].utterance |
| 0.20 | → application.lastresult$[3].confidence |

Although the text above describes using the 'application.lastresult$' array to store the recognition result (506) returned to the VoiceXML interpreter (192) by an ASR engine, readers will note that in other ECMAScript data structure may also be used to store the recognition results (506). For example, the VoiceXML interpreter (192) may store the recognition results in a field variable array similar to the application variable array described above.

The method of FIG. 5 includes determining (508), by the VoiceXML interpreter (192) according to semantic interpretation scripts (516) of the grammar (104), a weight (510) for each recognition result (506). Each weight (510) is a characteristic of each recognition result used to reorder the recognition results received from an ASR engine. Each weight (510) incorporates information used to order the recognition results (506) beyond the mere confidence level used by the ASR engine. For example, in a multimodal application (195) that returns song titles, the weights (510) determined by the VoiceXML interpreter (192) may incorporate information concerning each songs popularity. In a multimodal application (195) that retrieves patient information for a doctor, the weights (510) determined by the VoiceXML interpreter (192) may incorporate information concerning the doctor's current patients.

In the example of FIG. 5, the weight (510) for each recognition result may be represented using an ECMAScript data structure, such as for example, a shadow variable for each element in the 'application.lastresult$' array or a field variable array. For further example, consider the following exemplary shadow variable the 'application.lastresult$' array, application.lastresult$.weight in which the weight (510) for each recognition result (506) is stored in the shadow variable called 'weight.' Readers will note that the shadow variable described above is for explanation and not for limitation.

In the example of FIG. 5, each weight (510) may be statically or dynamically assigned to a recognition result using semantic interpretation scripts (516) in the grammar (104). Semantic interpretation scripts (516) are instructions embedded in the grammar (104) that are executed by the VoiceXML interpreter (192) based on the recognition results matched by the grammar (104). Semantic interpretation scripts (516) operates to transform the recognition result from the format matched by the ASR engine into a format more suitable for processing the multimodal application. Semantic interpretation scripts (516) may be embedded in the grammar (104) according to the Semantic Interpretation for Speech Recognition ('SISR') specification promulgated by the W3C or any other semantic interpretation specification as will occur to those of skill in the art.

In the example of FIG. 5, the semantic interpretation scripts (516) of the grammar (104) may statically define the weight (510) for each recognition result (506). For example, consider the following segment of an exemplary grammar that includes semantic interpretation scripts:

```
public <songs> =  Bad Girl {... $.songfield.weight=100} |
                  ...
                  Dad's Girl {... $.songfield.weight=55} |
                  ...
                  That Girl {... $.songfield.weight=203} |
                  ...
                  Third World {... $.songfield.weight=21} |
                  ...;
```

The exemplary grammar segment above illustrates four semantic interpretation scripts, each semantic interpretation script enclosed in curly brackets '{' and '}.' A multimodal application may utilize the exemplary grammar segment above to specify a set of valid responses from a user prompted by the multimodal application to provide a song title. The exemplary grammar segment above communicates various phrases to an ASR engine for use in recognizing a voice utterance containing the name of a song. A VoiceXML interpreter stores recognized results from an ASR engine in the 'songfield' field variable array. In the example above, each semantic interpretation script statically defines the weight for each recognition result by instructing the VoiceXML interpreter to assign a static value to the shadow variable 'weight' of the 'songfield' field variable array. Therefore, when the recognition result 'songfield.utterance' contains 'Bad Girl,' the weight 'songfield.weight' is statically defined as '100.' When the recognition result 'songfield.utterance' contains 'Dad's Girl,' the weight 'songfield.weight' is statically defined as '55.' When the recognition result 'songfield.utterance' contains 'That Girl,' the weight 'songfield.weight' is statically defined as '203.' When the recognition result 'songfield.utterance' contains 'Third World,' the weight 'songfield.weight' is statically defined as '21.' The static values '100,' '55,' '203,' and '21' may represent the popularity of a particular song, with higher numbers representing more popular songs and lower numbers representing less popular songs. Readers will note that the example above is for explanation and not for limitation.

Rather than statically defining the weight (510) for each recognition result (506) in the example of FIG. 5, the semantic interpretation scripts (516) of the grammar (104) may dynamically define the weight (510) for each recognition result (506). For example, consider the following segment of an exemplary grammar that includes semantic interpretation scripts:

```
public <song> = <songs> {... $.songfield.weight=getSongRank($.name)};
public <songs> =   Bad Girl |
                   ...
                   Dad's Girl |
                   ...
                   That Girl |
                   ...
                   Third World |
                   ...;
```

Again, the semantic interpretation script in the exemplary grammar segment above is enclosed in curly brackets '{' and '}.' In the example above, the semantic interpretation script dynamically defines the weight for each recognition result by instructing the VoiceXML interpreter to call the ECMAScript function 'getSongRank' using the song name for the recognized result as a parameter. The semantic interpretation script then instructs the VoiceXML interpreter to store the value returned from the 'getSongRank' function in the weight 'songfield.weight' for the recognized result for a song. The 'getSongRank' function may access the rank for the recognized song name from a song data repository. Readers will note that the example above is for explanation and not for limitation. Regardless of whether the semantic interpretation scripts (516) of the grammar (104) statically or dynamically define the weight (510) for each recognition result (506), the VoiceXML interpreter (192) may determine (508) a weight (510) for each recognition result (506) according to the method of FIG. 5 by executing the semantic interpretation script (516) in the grammar (104) corresponding to each recognition result (506).

The method of claim 5 also includes sorting (512), by the VoiceXML interpreter (192), the plurality of recognition results (506) in dependence upon the weight (510) for each recognition result (506). Sorting (512), by the VoiceXML interpreter (192), the plurality of recognition results (506) according to the method of FIG. 5 includes sorting (514), by the VoiceXML interpreter (192), the plurality of recognition results (506) in dependence upon the weight (510) for each recognition result (506) and a sorting attribute (518) for the grammar (104). The sorting attribute (518) of FIG. 5 is specified by the multimodal application (195) using a VoiceXML <grammar> element in the X+V page (124). For example, consider the following exemplary <grammar> element:

<grammar src="grammar.le" sort-weight="true"/>

The source attribute 'src' specifies the URI of the definition of an exemplary grammar 'grammar.le' that includes semantic interpretation scripts defining the weights for each recognition result statically or dynamically as explained above. The exemplary sorting attribute 'sort-weight' specifies whether to sort the plurality of recognition results (506) according to a value of the weight (510) for each recognition result (506). A value of 'true' for the exemplary sorting attribute 'sort-weight' specifies sorting the recognition results according to a value of the weight (510) for each recognition result (506) from highest to lowest. A value of 'false,' the default value, for the exemplary sorting attribute 'sort-weight' specifies sorting the recognition results according to the confidence level calculated by the ASR engine. Although in the example above, a value of 'true' for the weight sorting attribute 'sort-weight' specifies sorting the recognition results according to a value of the weight (510) for each recognition result (506) from highest to lowest, readers will note that in some embodiments, a value of true may specify sorting the recognition results from lowest to highest.

For further explanation of sorting (514), by the VoiceXML interpreter (192), the plurality of recognition results (506) in dependence upon the weight (510) for each recognition result (506) and a sorting attribute (518) for the grammar (104), consider the following table containing exemplary recognition results returned by the ASR engine and the corresponding weights (510) for each recognition result (506) determined by the VoiceXML interpreter (192) according to semantic interpretation scripts (516) of the grammar (104):

| RECOGNITION RESULTS | CONFIDENCE LEVEL | WEIGHTS |
|---|---|---|
| Bad Girl | 0.70 | 100 |
| Dad's Girl | 0.40 | 55 |
| That Girl | 0.35 | 203 |
| Third World | 0.20 | 21 |

In the exemplary table above, each of the exemplary recognition results are matched by an ASR engine to the voice utterance received in a VoiceXML interpreter. The confidence level for each recognition result is calculated by the ASR engine and returned to the VoiceXML interpreter along with each recognition result. As mentioned above, the VoiceXML interpreter may store the recognition results in the ECMAScript 'application.lastresult$' array in the order returned by the ASR engine, which is from highest confidence level to lowest confidence level. The recognition result may be stored in the 'application.lastresult$.utterance' shadow variable and the confidence level may be stored in the 'application.lastresult$.confidence' shadow variable. The weights are determined by the VoiceXML interpreter according to the semantic interpretation scripts in the grammar for the rules of the grammar used to match the recognition results. The weight for each recognition result may be stored in the 'application.lastresult$.weight' shadow variable.

When the sorting attribute (518) specifies sorting the plurality of recognition results (506) according to a value of the weight (510) for each recognition result (506) such as, for example, 'sort-weight="true",' then the VoiceXML interpreter may sort (514) the plurality of recognition results (506) in dependence upon the weight (510) for each recognition result (506) and the sorting attribute (518) to produce the following results in the 'application.lastresult$' array:

| RECOGNITION RESULTS | CONFIDENCE LEVEL | WEIGHTS |
|---|---|---|
| That Girl | 0.35 | 203 |
| Bad Girl | 0.70 | 100 |
| Dad's Girl | 0.40 | 55 |
| Third World | 0.20 | 21 |

Readers will note after the VoiceXML interpreter sorts (514) the plurality of recognition results (506) in dependence upon the weight (510) for each recognition result (506) and the sorting attribute (518), the song title 'That Girl' is now in the first element of the 'application.lastresult$' array because 'That Girl' has the highest weight. In the recognition results (506) returned to the VoiceXML interpreter by the ASR engine, however, the song title 'Bad Girl' was the first element in the 'application.lastresult$' array because it had the highest confidence level. The VoiceXML interpreter may sort (514) the plurality of recognition results (506) in dependence upon the weight (510) for each recognition result (506) and the sorting attribute (518) according to the method of FIG. 5 using any number of sorting algorithms as will occur to those of skill in the art. Sorting (514) the plurality of recognition results (506) in dependence upon the weight (510) for each recognition result (506) and a sorting attribute (518) according to the method of FIG. 5 therefore advantageously orders the recognition results produced by the ASR engine based on a weighting other than the result's confidence level.

In the example of FIG. 5, the sorting attribute (518) may also specify sorting the plurality of recognition results (506) according to an ECMAScript script. For example, consider the following exemplary <grammar> element:

<grammar    src="grammar.le"    sort-expr="reorderWeights( )"/>

The source attribute 'src' specifies the URI of the definition of an exemplary grammar 'grammar.le' that includes semantic interpretation scripts defining the weights for each recognition result statically or dynamically as explained above. The exemplary sorting attribute 'sort-expr' specifies sorting the plurality of recognition results (506) according to an ECMAScript script 'reorderWeights( ).' For further explanation, again consider the following table containing exemplary recognition results returned by the ASR engine and the corresponding weights (510) for each recognition result (506) determined by the VoiceXML interpreter (192) according to semantic interpretation scripts (516) of the grammar (104):

| RECOGNITION RESULTS | CONFIDENCE LEVEL | WEIGHTS |
|---|---|---|
| Bad Girl | 0.70 | 100 |
| Dad's Girl | 0.40 | 55 |
| That Girl | 0.35 | 203 |
| Third World | 0.20 | 21 |

In the exemplary table above, each of the exemplary recognition results are matched by an ASR engine to the voice utterance received in a VoiceXML interpreter. The confidence level for each recognition result is calculated by the ASR engine and returned to the VoiceXML interpreter along with each recognition result. As mentioned above, the VoiceXML interpreter may store the recognition results in the ECMAScript 'application.lastresult$' array in the order returned by the ASR engine, which is from highest confidence level to lowest confidence level. The recognition result may be stored in the 'application.lastresult$.utterance' shadow variable and the confidence level may be stored in the 'application.lastresult$.confidence' shadow variable. The weights are determined by the VoiceXML interpreter according to the semantic interpretation scripts in the grammar for the rules of the grammar used to match the recognition results. The weight for each recognition result may be stored in the 'application.lastresult$.weight' shadow variable. After the VoiceXML interpreter determines weights for each recognition result in the 'application.lastresults$' array, the VoiceXML interpreter may execute the 'reorderWeights( )' script to reorder the 'application.lastresult$' array based on the weight of each recognition result.

In the example above, the 'reorderWeights( )' script sorts the recognition results (506) based on both the weight (510) for each result and the confidence level for each result. In particular, the exemplary 'reorderWeights( )' script sorts the recognition results (506) based on the product of the confidence level for each recognition result (506) and the weight (510) for each recognition result (506). Readers will note, however, that the exemplary 'reorderWeights( )' script is used for explanation only and not for limitation. When the sorting attribute (518) specifies sorting the plurality of recognition results (506) according to the exemplary ECMAScript script 'reorderWeights( ),' then the VoiceXML interpreter may sort (514) the plurality of recognition results (506) in dependence upon the weight (510) for each recognition result (506) and the sorting attribute (518) to produce the following results in the 'application.lastresult$' array:

| RECOGNITION RESULTS | CONFIDENCE LEVEL | WEIGHTS |
|---|---|---|
| That Girl | 0.35 | 203 |
| Bad Girl | 0.70 | 100 |
| Dad's Girl | 0.40 | 55 |
| Third World | 0.20 | 21 |

Readers will note after the VoiceXML interpreter sorts (514) the plurality of recognition results (506) in dependence upon the weight (510) for each recognition result (506) and the sorting attribute (518), the song title 'That Girl' is now in the first element of the 'application.lastresult$' array because 'That Girl' has the highest product for the weight and confidence level. In the recognition results (506) returned to the VoiceXML interpreter by the ASR engine, however, the song title 'Bad Girl' was the first element in the 'application.lastresult$' array because it had the highest confidence level. The VoiceXML interpreter may sort (514) the plurality of recognition results (506) in dependence upon the weight (510) for each recognition result (506) and the sorting attribute (518) according to the method of FIG. 5 using any number of sorting algorithms as will occur to those of skill in the art. Sorting (514) the plurality of recognition results (506) in dependence upon the weight (510) for each recognition result (506) and a sorting attribute (518) according to the method of FIG. 5 therefore advantageously orders the recognition results produced by the ASR engine based on a weighting other than the result's confidence level.

Exemplary embodiments of the present invention are described largely in the context of a fully functional computer system for ordering recognition results produced by an ASR engine for a multimodal application. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of ordering recognition results produced by an automatic speech recognition ('ASR') engine for a multimodal application, the method implemented with a grammar of the multimodal application in the ASR engine, with the multimodal application operating in a multimodal browser on a multimodal device supporting multiple modes of interaction including a voice mode and one or more non-voice modes, the multimodal application operatively coupled to the ASR engine through a VoiceXML interpreter, the method comprising:

receiving, in the VoiceXML interpreter from the multimodal application, a voice utterance;

determining, by the VoiceXML interpreter using the ASR engine, a plurality of recognition results in dependence upon the voice utterance and the grammar;

determining, by the VoiceXML interpreter according to semantic interpretation scripts of the grammar, a weight for each recognition result; and sorting, by the VoiceXML interpreter, the plurality of recognition results in dependence upon the weight for each recognition result.

2. The method of claim 1 wherein sorting, by the VoiceXML interpreter, the plurality of recognition results in dependence upon the weight for each recognition result comprises sorting, by the VoiceXML interpreter, the plurality of recognition results in dependence upon the weight for each recognition result in accordance with a sorting attribute for the grammar defining a sorting scheme, the sorting attribute specified by the multimodal application using a VoiceXML <grammar> element.

3. The method of claim 2 wherein the sorting attribute specifies sorting the plurality of recognition results according to a value of the weight for each recognition result.

4. The method of claim 2 wherein the sorting attribute specifies sorting the plurality of recognition results according to an ECMAScript script.

5. The method of claim 1 wherein the semantic interpretation scripts of the grammar statically define the weight for each recognition result.

6. The method of claim 1 wherein the semantic interpretation scripts of the grammar dynamically define the weight for each recognition result.

7. Apparatus for implementing a method of ordering recognition results produced by an automatic speech recognition ('ASR') engine for a multimodal application, the method implemented with a grammar of the multimodal application in the ASR engine, with the multimodal application operating in a multimodal browser on a multimodal device supporting multiple modes of interaction including a voice mode and one or more non-voice modes, the multimodal application operatively coupled to the ASR engine through a VoiceXML interpreter, the apparatus comprising:

at least one computer processor; and a computer memory operatively coupled to the at least one computer processor, the computer memory storing computer program instructions which, when executed by the at least one computer processor, cause performance of the method, the method comprising:

receiving, in the VoiceXML interpreter from the multimodal application, a voice utterance;

determining, by the VoiceXML interpreter using the ASR engine, a plurality of recognition results in dependence upon the voice utterance and the grammar;

determining, by the VoiceXML interpreter according to semantic interpretation scripts of the grammar, a weight for each recognition result; and sorting, by the VoiceXML interpreter, the plurality of recognition results in dependence upon the weight for each recognition result.

8. The apparatus of claim 7 wherein sorting, by the VoiceXML interpreter, the plurality of recognition results in dependence upon the weight for each recognition result comprises sorting, by the VoiceXML interpreter, the plurality of recognition results in dependence upon the weight for each recognition result in accordance with a sorting attribute for the grammar defining a sorting scheme, the sorting attribute specified by the multimodal application using a VoiceXML <grammar> element.

9. The apparatus of claim 8 wherein the sorting attribute specifies sorting the plurality of recognition results according to a value of the weight for each recognition result.

10. The apparatus of claim 8 wherein the sorting attribute specifies sorting the plurality of recognition results according to an ECMAScript script.

11. The apparatus of claim 7 wherein the semantic interpretation scripts of the grammar statically define the weight for each recognition result.

12. The apparatus of claim 7 wherein the semantic interpretation scripts of the grammar dynamically define the weight for each recognition result.

13. A computer program product for ordering recognition results produced by an automatic speech recognition ('ASR') engine for a multimodal application, with the multimodal application operating in a multimodal browser on a multimodal device supporting multiple modes of interaction including a voice mode and one or more non-voice modes, the multimodal application operatively coupled to the ASR engine through a VoiceXML interpreter, the computer program product disposed upon a recordable computer-readable medium, the computer program product comprising computer program instructions which, when executed, cause performance of a method comprising:

receiving, in the VoiceXML interpreter from the multimodal application, a voice utterance;

determining, by the VoiceXML interpreter using the ASR engine, a plurality of recognition results in dependence upon the voice utterance and a grammar of the multimodal application;

determining, by the VoiceXML interpreter according to semantic interpretation scripts of the grammar, a weight for each recognition result; and sorting, by the VoiceXML interpreter, the plurality of recognition results in dependence upon the weight for each recognition result.

14. The computer program product of claim 13 wherein the semantic interpretation scripts of the grammar statically define the weight for each recognition result.

15. The computer program product of claim 13 wherein the semantic interpretation scripts of the grammar dynamically define the weight for each recognition result.

16. The computer program product of claim 13 wherein sorting, by the VoiceXML interpreter, the plurality of recognition results in dependence upon the weight for each recognition result comprises sorting, by the VoiceXML interpreter, the plurality of recognition results in dependence upon the weight for each recognition result in accordance with a sorting attribute for the grammar defining a sorting scheme, the sorting attribute specified by the multimodal application using a VoiceXML <grammar> element.

17. The computer program product of claim 16 wherein the sorting attribute specifies sorting the plurality of recognition results according to a value of the weight for each recognition result.

18. The computer program product of claim 16 wherein the sorting attribute specifies sorting the plurality of recognition results according to an ECMAScript script.

* * * * *